US009948503B2

United States Patent
Vedula

(10) Patent No.: US 9,948,503 B2
(45) Date of Patent: Apr. 17, 2018

(54) GATEWAY REDUNDANCY PROTOCOL FOR COMMUNICATIONS NETWORKS

(71) Applicant: Hughes Network Systems, LLC, Germantown, MD (US)

(72) Inventor: Shanti Swarup Vedula, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 8 days.

(21) Appl. No.: 14/921,050

(22) Filed: Oct. 23, 2015

(65) Prior Publication Data
US 2017/0118067 A1    Apr. 27, 2017

(51) Int. Cl.
| G06F 11/00 | (2006.01) |
| H04J 1/16 | (2006.01) |
| H04J 3/14 | (2006.01) |
| H04L 12/26 | (2006.01) |
| H04L 12/24 | (2006.01) |
| H04L 29/12 | (2006.01) |

(52) U.S. Cl.
CPC .......... *H04L 41/0668* (2013.01); *H04L 43/10* (2013.01); *H04L 61/103* (2013.01); *H04L 61/2015* (2013.01)

(58) Field of Classification Search
CPC ...... H04L 41/0668; H04L 69/40; H04L 43/10
USPC ....... 370/216, 217, 218, 219, 220, 221, 222, 370/223, 224, 225, 226, 227, 228
See application file for complete search history.

(56) References Cited

U.S. PATENT DOCUMENTS

| 7,929,543 B2* | 4/2011 | Miyata | H04L 12/66 370/230 |
| 8,001,269 B1* | 8/2011 | Satapati | H04L 29/12028 709/245 |
| 2004/0215821 A1* | 10/2004 | Regan | H04L 45/00 709/240 |
| 2007/0008880 A1* | 1/2007 | Buchko | H04L 45/00 370/218 |

(Continued)

OTHER PUBLICATIONS

Extreme Networks, "Extreme Standby Router Protocol and Virtual Routing Redundancy Protocol", ESRP and VRRP, 1308_02, Nov. 2010.

(Continued)

*Primary Examiner* — Chuong T Ho
(74) *Attorney, Agent, or Firm* — Potomac Technology Law, LLC

(57) ABSTRACT

Each of a first group of gateway nodes of a communications network operates as a primary gateway identified by a respective unique gateway identification number (GWID), and each of a second group of gateway nodes operates as a backup gateway. Each gateway node has an assigned backup priority level with respect to each GWID. The gateway nodes are interconnected via a common local network. In the event that a primary gateway node becomes non-operational, the backup gateway that is assigned the highest priority level with respect to the GWID of the non-operational primary gateway assumes operation as the primary gateway identified by that GWID. Upon restoration of the non-operational gateway node, the gateway node operates as a backup gateway in place of the gateway node that assumed its operation as the primary gateway. A gateway node operates as a primary gateway for only one respective GWID at a time.

18 Claims, 7 Drawing Sheets

(56) References Cited

U.S. PATENT DOCUMENTS

| | | | | |
|---|---|---|---|---|
| 2011/0170555 A1* | 7/2011 | Miyata | .................... | H04L 12/66 370/401 |
| 2011/0292933 A1* | 12/2011 | Rodriguez Perez | .. | H04L 45/586 370/389 |
| 2015/0055650 A1* | 2/2015 | Bhat | ..................... | H04L 12/185 370/390 |
| 2015/0163002 A1* | 6/2015 | Frison | .................. | H04W 4/005 370/220 |
| 2016/0344628 A1* | 11/2016 | Hocker | ................ | H04L 45/586 |

OTHER PUBLICATIONS

Li, et al., "Cisco Hot Standby Router Protocol", IETF RFC-2281, Mar. 1998.
Nadas, "Virtual Router Redundancy Protocol (VRRP) Version 3 for IPv4 and IPv6", IETF RFC-5798, Mar. 2010.
Wikipedia, "First Hop Redundancy Protocols", https://en.wikipedia.org/wiki/First-hop_redundancy_protocols, Nov. 2009.

* cited by examiner

GATEWAY REDUNDANCY PROTOCOL FOR COMMUNICATIONS NETWORKS

BACKGROUND

In communications networks, terminals may form a peer relationship with an associated gateway (e.g., an Internet protocol (IP) gateway) for a variety of purposes. Such purposes include enhancement of communications sessions over the network, such as the provision or utilization of security (e.g., IPsec) for communications links over the network, protocol acceleration (e.g., TCP performance enhancing proxies (PEP)), and data compression (e.g., IP header compression).

For network providers, a critical factor for commercial success is the level of reliability and quality of service provided to the various network subscribers. Network subscribers, for example, may range from individual consumer Internet subscribers to enterprise subscribers (including services and applications for communications between different corporate locations, such as a head office and various remote branch offices and teleworkers). Further, such enterprise subscribers may subscribe to a wide variety of applications and services (e.g., broadcast/multicast services, virtual private network (VPN) services, high speed Internet services and media streaming services, requiring a wide range of quality of service and reliability levels). In order to maintain the network services and functions, and to provide reliable communications and quality of service, to the various network subscribers, gateway availability becomes a significant and perhaps critical factor, because the gateway availability affects the services provided to a large number of terminals that are associated with and serviced by the gateway. One way of ensuring and improving gateway availability is to provide for gateway redundancy to cover for gateway outages and maintenance.

What is needed, therefore, is an approach for efficient, cost effective and reliable gateway redundancy that maximizes reliability and quality of service, while minimizing transitions between operational gateways and redundant backup gateways.

SOME EXAMPLE EMBODIMENTS

The present invention advantageously addresses the foregoing requirements and needs, as well as others, by providing an approach for an efficient, cost effective and reliable gateway redundancy protocol that maximizes reliability and quality of service, while minimizing transitions between operational gateways and redundant backup gateways.

According to example embodiments, a communications system comprises a plurality of gateway nodes, and a plurality of subscriber terminals. The communications system is configured to operate whereby, at any point in time, each of a first number of the gateway nodes operates as a primary gateway identified by a respective unique gateway identification number (GWID), and each of a second number of the gateway nodes operates as a backup gateway. Each gateway node has an assigned backup priority level with respect to each GWID. The gateway nodes are interconnected via a common local network. In the event of a failure or other event that renders a one of the gateway nodes operating as primary gateways non-operational, the backup gateway, within the second number of gateway nodes operating as backup gateways at that time, which is assigned a highest priority level with respect to the GWID of the non-operational gateway, is configured to assume the operation as the primary gateway identified by that GWID. Upon restoration of the non-operational gateway node to an operational state, that gateway node is configured to operate as a one of the backup gateways in place of the gateway node that assumed its operation as the primary gateway. Each of the gateway nodes is configured to operate as a primary gateway for only one respective GWID at any given time.

According to a further embodiment, a first subset of the gateway nodes operating as primary gateways identified by a first subset of the GWIDs and a first subset of the gateway nodes operating as backup gateways are located at a first network operations site that is situated at a different geographic location than that of a further network operations site of each of one or more respective other subsets of the gateway nodes operating as primary gateways identified by respective other subset(s) of the GWIDs and one or more respective other subset(s) of the gateway nodes operating as backup gateways. The gateway nodes of each network operations site are interconnected via a respective local network. The gateway nodes of the first network operations site are interconnected with the gateway nodes of each further network operations site via a wide-area network. By way of example, the local network of the gateway nodes of the first network operations site and the local network of the gateway nodes of each further network operations site are on a common subnet of the wide-area network; and the backup priority levels assigned to the gateway nodes located at the first network operations site are configured whereby the gateway nodes located at that site are preferred as backup gateways for the GWIDs of the primary gateways operating at that site over the gateway nodes located at each further network operations site. By way of further example, the local network of the gateway nodes of the first network operations site is on a different subnet of the wide-area network than the local network of the gateway nodes of each further network operations site; and each gateway node is configured to perform the assumption of the operation of a non-operational primary gateway of the first network operations site only when the gateway node is operating as a backup gateway of the first network operations site. By way of further example, the local network of the gateway nodes of the first network operations site is on a different subnet of the wide-area network than the local network of the gateway nodes of each of at least one further network operations site; and the local network of the gateway nodes of the first network operations site and the local network of the gateway nodes of each of at least one further network operations site are on a common subnet of the wide-area network; and each gateway node is configured to perform the assumption of the operation of a non-operational primary gateway of the first network operations site only when the gateway node is operating as a backup gateway of the first network operations site or of a one of the further network operations site(s) that is on the common subnet of the wide-area network. By way of further example, the backup priority levels assigned to the gateway nodes located at the first network operations site are configured whereby the gateway nodes located at that site are preferred as backup gateways for the GWIDs of the primary gateways operating at that site over the gateway nodes located at each further network operations site that is on the common subnet of the wide-area network.

According to a further embodiment, each gateway node is configured to, while operating as a primary gateway, periodically transmit a heartbeat message, which indicates that the gateway node is operational, in a manner whereby the gateway nodes operating as backup gateways are able to receive the heartbeat message; and each gateway node is configured to, while operating as a backup gateway and in the event that the gateway node does not receive a preconfigured successive number of respective heartbeat messages of a primary gateway, assume that the primary gateway is non-operational, and determine whether to perform the assumption of the operation of the non-operational primary gateway based on its backup priority level with respect to the GWID of the non-operational primary gateway relative to the backup priority levels of the other gateway nodes operating as backup gateways.

According to a further embodiment, each gateway node is configured to, while operating as a backup gateway, not respond to an address resolution protocol request for an IP address associated with the primary gateway node, discard data packets with a destination link layer media access control (MAC) address equal to a MAC address of the primary gateway node, and not accept a data packet addressed to an IP address associated with the primary gateway node.

According to a further embodiment, each gateway node is configured to, while operating as a primary gateway, respond to an address resolution protocol request for an IP address associated with the primary gateway node, forward data packets with a destination link layer media access control (MAC) address equal to a MAC address of the primary gateway node, and accept data packets addressed to an IP address associated with the primary gateway node.

According to a further embodiment, upon transitioning to the operation as the primary gateway, the transitioned gateway node is configured to ignore virtual redundancy messages regarding all other primary gateways other than the respective primary gateway of which it has assumed operations, and each gateway node operating as a backup gateway is configured to accept and process virtual redundancy messages for all GWIDs of primary gateways for which it is operating as a backup.

According to further example embodiments, a method is provided. A second gateway node of a group of gateway nodes operating as backup gateways of a communications network assumes operation as a primary gateway for a first gateway node of a group of gateway nodes operating as primary gateways of the communications network, in the event of a failure or other event that renders the first gateway node non-operational. Each primary gateway is identified by a unique gateway identification number (GWID), and each gateway node has an assigned backup priority level with respect to each GWID. Each gateway node of the group of gateway nodes operating as primary gateways operates as a primary gateway associated with only one GWID at any given point in time. The second gateway node assumes the operation as the primary gateway for the first gateway node because it has a higher priority level associated with the GWID of the primary gateway as which the first gateway was operating than that of the other gateway nodes of the group of gateway nodes operating as the backup gateways. Upon the first gateway node returning to an operational state, the first gateway node assumes operation as a further backup gateway within the group of gateway nodes operating as backup gateways.

According to a further embodiment, a first subset of the group of gateway nodes operating as primary gateways identified by a first subset of the GWIDs and a first subset of the group of gateway nodes operating as backup gateways are located at a first network operations site that is situated at a different geographic location than that of a further network operations site of each of one or more respective other subsets of the group of gateway nodes operating as primary gateways identified by respective other subset(s) of the GWIDs and one or more respective other subset(s) of the group of gateway nodes operating as backup gateways. The gateway nodes of each network operations site communicate with each other via a respective local network. The gateway nodes of the first network operations site communicate with the gateway nodes of each further network operations site via a wide-area network. By way of example, the local network of the gateway nodes of the first network operations site and the local network of the gateway nodes of each further network operations site are on a common subnet of the wide-area network; and the backup priority levels assigned to the gateway nodes located at the first network operations site are configured whereby the gateway nodes located at that site are preferred as backup gateways for the GWIDs of the primary gateways operating at that site over the gateway nodes located at each further network operations site. By way of further example, the local network of the gateway nodes of the first network operations site is on a different subnet of the wide-area network than the local network of the gateway nodes of each further network operations site; and each gateway node assumes the operation of a non-operational primary gateway of the first network operations site only when the gateway node is operating as a backup gateway of the first network operations site. By way of further example, the local network of the gateway nodes of the first network operations site is on a different subnet of the wide-area network than the local network of the gateway nodes of each of at least one further network operations site; and the local network of the gateway nodes of the first network operations site and the local network of the gateway nodes of each of at least one further network operations site are on a common subnet of the wide-area network; and each gateway node assumes the operation of a non-operational primary gateway of the first network operations site only when the gateway node is operating as a backup gateway of the first network operations site or of a one of the further network operations site(s) that is on the common subnet of the wide-area network. By way of further example, the backup priority levels assigned to the gateway nodes located at the first network operations site are configured whereby the gateway nodes located at that site are preferred as backup gateways for the GWIDs of the primary gateways operating at that site over the gateway nodes located at each further network operations site that is on the common subnet of the wide-area network.

According to a further embodiment, while operating as a primary gateway, each gateway node periodically transmits a heartbeat message, which indicates that the gateway node is operational, in a manner whereby the gateway nodes operating as backup gateways are able to receive the heartbeat message; and while operating as a backup gateway, each gateway node receives the periodic heartbeat messages of the gateway nodes operating as primary gateways, and, in the event that a preconfigured successive number of heartbeat messages of a respective primary gateway are not received, assume that the primary gateway is non-operational, and determine whether to assume the operation of the non-operational primary gateway based on its backup priority level with respect to the GWID of the non-operational primary gateway relative to the backup priority levels of the other gateway nodes operating as backup gateways.

According to a further embodiment, each gateway node, while operating as a backup gateway, ignores address resolution protocol request for an IP address associated with the primary gateway node, discards data packets with a destination link layer media access control (MAC) address equal to a MAC address of the primary gateway node, and rejects data packets addressed to an IP address associated with the primary gateway node.

According to a further embodiment, each gateway, while operating as a primary gateway, responds to address resolution protocol requests for an IP address associated with the primary gateway node, forwards data packets with a destination link layer media access control (MAC) address equal to a MAC address of the primary gateway node, and accepts data packets addressed to an IP address associated with the primary gateway node.

According to a further embodiment, upon transitioning to the operation as the primary gateway, the transitioned gateway node ignores virtual redundancy messages regarding all other primary gateways other than the respective primary gateway of which it has assumed operations, and each gateway node operating as a backup gateway accepts and processes virtual redundancy messages for all GWIDs of primary gateways for which it is serving as a backup.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Approaches for a gateway redundancy protocol, which provides for effective gateway redundancy that maximizes reliability and quality of service in an efficient and cost effective manner, while minimizing transitions between operational gateways and redundant backup gateways, are provided. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
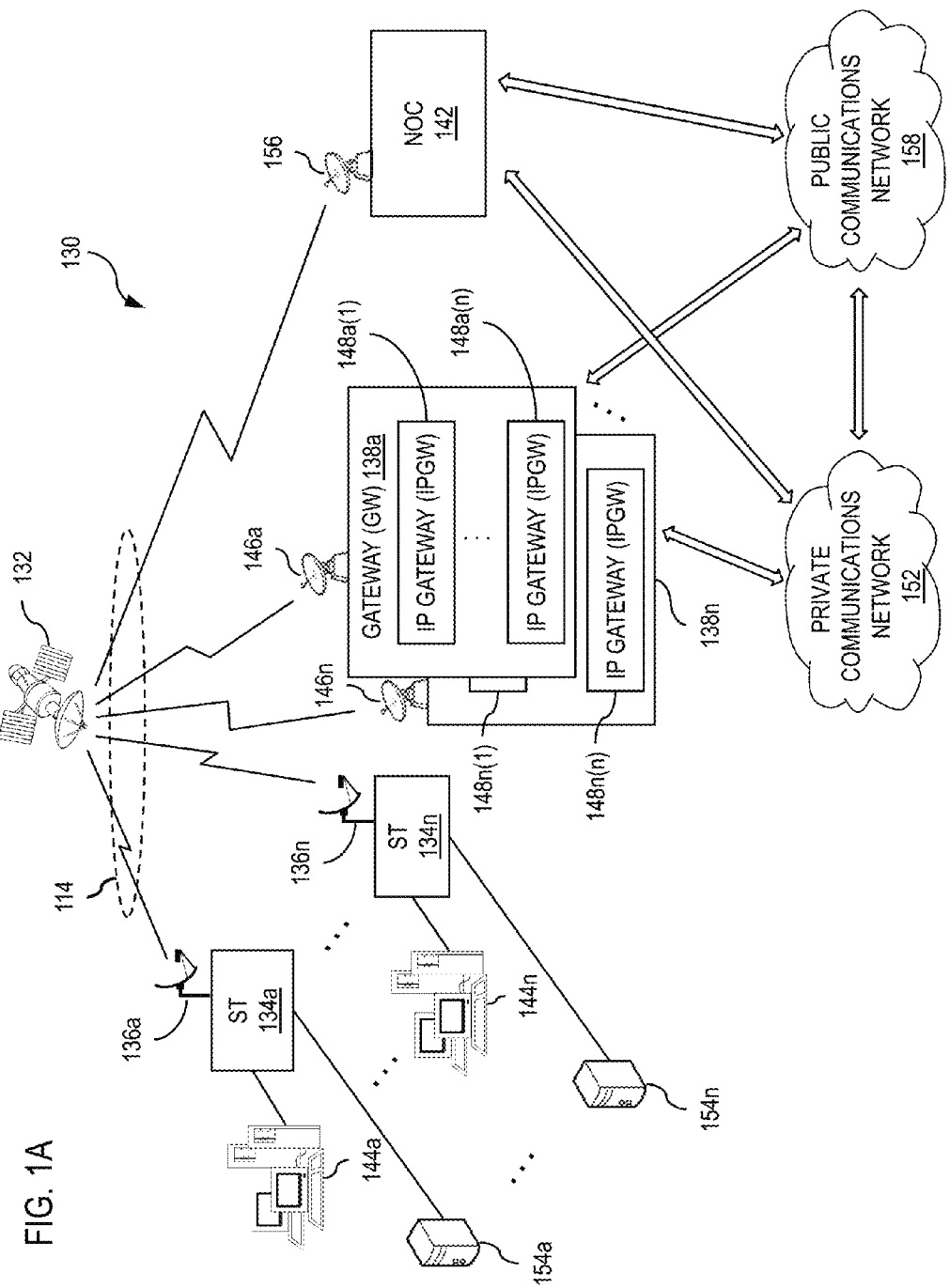
FIGS. 1A and 1B illustrate satellite communications systems employing an approach for a gateway redundancy protocol, in accordance with example embodiments.
Figure 1B:
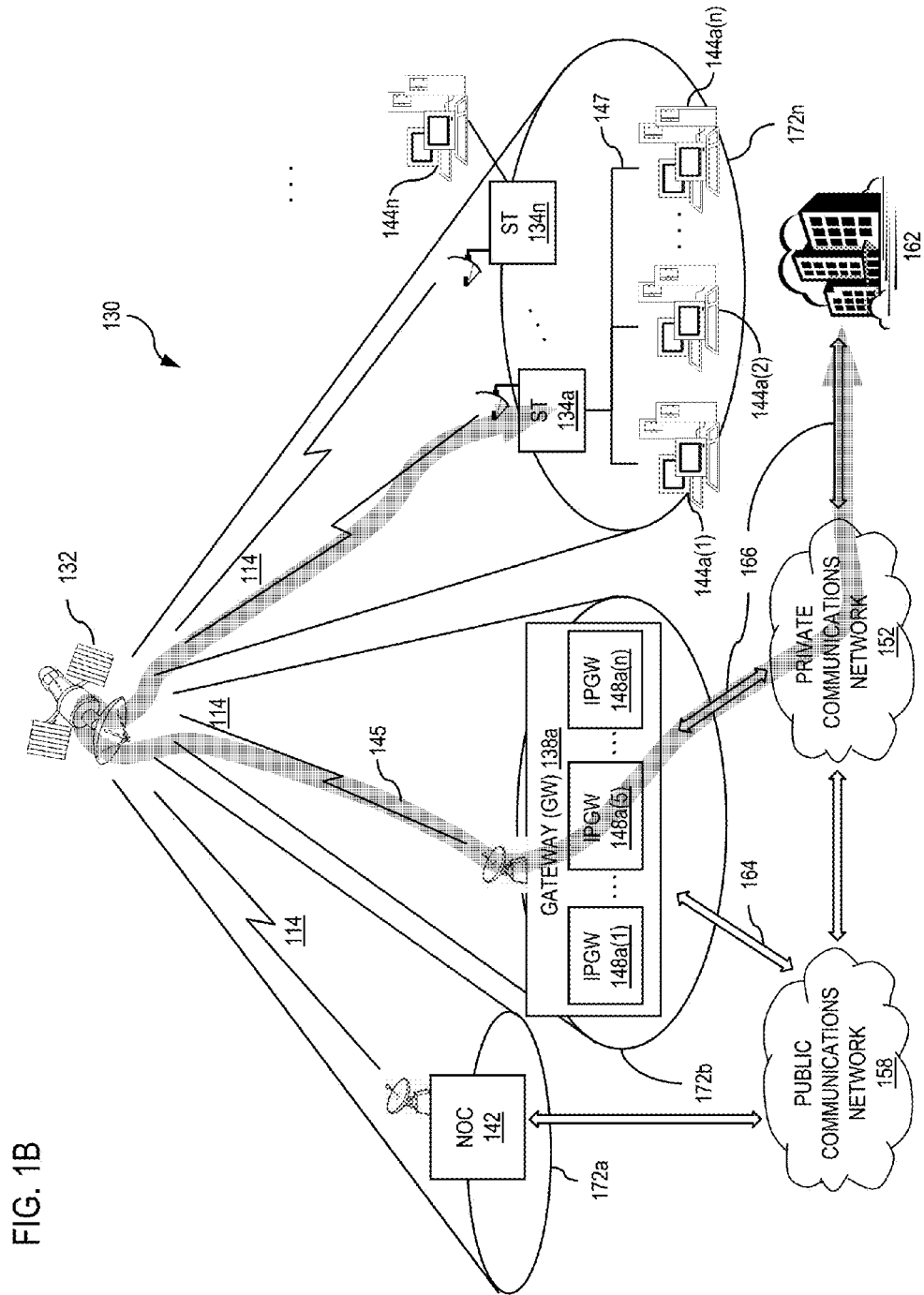

FIGS. 1A and 1B illustrate satellite communications systems employing an approach for a gateway redundancy protocol, according to various example embodiments. FIG. 1A illustrates an example satellite communications system 130 capable of supporting communications among terminals with varied capabilities, according to example embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134*a* and 134*n*).

In a bent-pipe system of an example embodiment, the satellite 132 operates as a repeater or bent pipe, and communications to and from the STs 134*a*-134*n* are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1B, for example, for a data communication from ST 134*a* to a public communications network 158 (e.g., the Internet), the ST 134*a* is associated with an IPGW (e.g., IPGW 148*a*(1)—selected from a pool of IPGWs available to the ST 134*a*, such as IPGWs 148*a*(1)-148*a*(5)—where the pool of IPGWs is a suitable subset of the IPGWs 148*a*(1)-148*a*(*n*) located at the GW 138*a*). The data is first transmitted, via the satellite 132, from the ST 134*a* to associated IPGW 148*a*(1). The IPGW 148*a*(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134*n*, located at a remote corporate location, may desire to securely communicate with the corporate headquarters or enterprise 162. Accordingly, for a data communication from ST 134*n* to the corporate headquarters or enterprise 162, the data is first transmitted, via the satellite 132, from the ST 134*n* to an IPGW associated with the ST 134*n* (e.g., IPGW 148*a*(5)). The IPGW 148*a*(5) determines the destination as being the corporate headquarters or enterprise 162. The IPGW then repackages the data (e.g., as an IPsec communication), and routes the IPsec data communication, via the secure terrestrial links 166 (over the private network 152), to the corporate headquarters or enterprise 162. In the corporate network scenario, a further example involves a corporate communications from the corporate headquarters to a number of remote sites (e.g., a multicast communication to STs 134*a*-134*n*)—where STs 134*a*-134*n* are correspondingly associated with the two IPGWs 148*a*(1) and 148*a*(5) (e.g., grouped between the two IPGWs based on load balancing and IPGW capabilities). In this scenario, a gateway or router, within the local network of corporate headquarters or enterprise 162, transmits the data communication, via the secure terrestrial links 166 (over the private network 152), to the IPGWs 148*a*(1) and 148*a*(5). The IPGWs determine that the communication is destined for the remote STs 134*a*-134*n*, and package the data as a multicast communication addressed to the community of STs 134*a*-134*n*. The IPGWs then transmit the data communication, via the satellite 132, for decoding by the community of STs 134*a*-134*n*. Accordingly, the satellite of such a system acts as a bent pipe or repeater, transmitting communications between the STs 134*a*-134*n* and their respective associated IPGWs 148*a*-148*n*. Further, the ST 134*a* may be networked with a number of client terminals 144*a*(1), 144*a*(2), . . . , 144*a*(*n*), via a network 147 (e.g., a local area network (LAN)). For example, the LAN 147 and client terminals 144*a*(1), 144*a*(2), . . . , 144*a*(*n*) may represent a branch office of the corporate headquarters or enterprise 162.

For traffic management in such a system, one of the most critical elements for service differentiation is the identification and mapping of ingress traffic to a traffic class best suited to support respective quality of service (QoS) requirements. Mechanisms for service differentiation in packet data networks (e.g., the Internet) rely on packet classification. Further, for improved efficiency, such traffic classification should be employed, in a practical and expeditious manner, at the early stages of a traffic flow, such as at a terminal node where the traffic flow originates. Additionally, traffic classification methods may also be employed to identify flows that are to be mapped to special process functions, such as TCP performance enhancing proxies, packet drop, header compression, etc.

According to example embodiments, terminals 134 and Gateways 138 form a peer relationship in communication networks to provide a variety of features and services. As one example, security (e.g., Internet Protocol security or IPsec) may be provided in the form of an IPsec tunnel 145 between the corporate headquarters or enterprise 162 and one or more of the remote terminals or VSATs 134*a*-134*n*. IPsec is a protocol suite for securing Internet protocol (IP) communications by authenticating and encrypting each IP packet of a communication session. IPsec includes protocols for establishing mutual authentication between agents at the beginning of the session and negotiation of cryptographic keys to be used during the session. IPsec can be used in protecting data flows between a pair of hosts (host-to-host), between a pair of security gateways (network-to-network), or between a security gateway and a host (network-to-host). IPsec uses cryptographic security services to protect communications over IP networks, and supports network-level peer authentication, data origin authentication, data integrity, data confidentiality (encryption), and replay protection.

As a further example, protocol acceleration (e.g., Transmission Control Protocol (TCP) Performance Enhancing Proxy (PEP)) may additionally or alternatively be provided between the corporate headquarters or enterprise 162 and one or more of the remote terminals or VSATs 134*a*-134*n*. A performance-enhancing proxy (PEP) is a network agent designed to improve the end-to-end performance of respective communications protocols. As one example, a split transmission control protocol (TCP) PEP may be employed to address latency issues resulting from one way and round trip transmission delays over a high latency link (e.g., a satellite communications channel). A split TCP PEP functions by splitting an end-to-end connection into multiple segments, using different parameters to transfer data across the different segments. As one example of a split TCP PEP, a TCP connection is split into segments where a proxy is located at the two endpoints of a high latency segment over which the connection communications will be enhanced or accelerated. Each PEP proxy terminates the TCP connection as to the respective local client(s), and communicates with the other PEP proxy over the high latency link via an accelerated communications protocol. At the local end of each PEP endpoint, the respective proxy simulates communications with its respective local client(s) to appear as if the communications originate from the remote or destination endpoint, using the standard TCP protocol with no modifications. The local clients and the end-to-end system thereby operates via the standard TCP protocol, without knowledge of the PEP functions running between them over the high latency link. By way of example, TCP spoofing may be employed to address performance limitations of TCP connections, for example arising from one-way and round-trip communications latency over long-delay links (e.g., links over geosynchronous satellite channels), which may be compounded by the added latency of the TCP connection establishment handshaking algorithm employed with the start-up of every TCP connection. For more detailed descriptions of different TCP spoofing approaches, see, for example, U.S. Pat. Nos. 6,161,141, 6,973,497, 7,133,361.

As yet a further example, data compression, such as IP header compression may be provided to further accelerate data traffic transmission over a network, and to contribute to more efficient utilization of network bandwidth. The overhead associated with the headers of IP packets (also user datagram protocol (UDP) and real-time transport protocol (RTP)) can be as large as 40 bytes for IPv4 and 60 bytes for IPv6—which amounts to a substantial percentage of the overall packet data transmissions. Such large overheads are especially significant in wide area networks (WANs) and wireless systems (e.g., cellular and satellite) where bandwidth may be limited and the cost per bit may be relatively high. Header compression may thus be applied to reduce the bandwidth overhead associated with such transmission protocols. Header compression techniques may be applied to reduce the header size down to as little as just a few header bytes per packet. By way of example, static or redundant header information is transmitted in only the first packets of a session, and the subsequent packets are then transmitted with only the variable header information (e.g., identifiers, sequence numbers, etc.). In other words, the state of TCP connections are saved at both ends of a link (based on the initial packets), and only the data of the header fields that vary are transmitted during the session.

As discussed above, FIG. 1B shows an example of a communications tunnel (e.g., a secure tunnel that may also be running PEP functions) maintained between a satellite terminal (e.g., ST 134*a*) and a gateway (e.g., GW 138*a* and IPGW 148*a*(5)) in a satellite broadband network. As would be evident to one of skill in the art, however, such architectures and functionality would be equally applicable to a terrestrial broadband network, with the customer premise equipment (CPE) and the respective gateway forming a peer relationship.

For network providers, a critical factor for commercial success is the level of reliability and quality of service provided to the various network subscribers. Network subscribers, for example, may range from individual consumer Internet subscribers to the enterprise 162 and its remote offices (such as the remote office serviced by the ST 134*a* and LAN 147). Further, such enterprise subscribers may subscribe to a wide variety of applications and services (e.g., broadcast/multicast services, virtual private network (VPN) services, high speed Internet services and media streaming services, requiring a wide range of quality of service and reliability levels). In order to maintain the network services and functions, and to provide reliable communications and quality of service, to the various network subscribers, gateway availability becomes a significant and perhaps critical factor, because the gateway availability affects the services provided to a large number of terminals that are associated with and serviced by the gateway. One way of ensuring and improving gateway availability is to provide for gateway redundancy to cover for gateway outages and maintenance.

Current gateway redundancy schemes include one-to-one (1:1) redundancy pairs, N:M redundancy, N:1 redundancy, and gateway load balancing. In a 1:1 redundancy scheme, the gateways are typically deployed as redundant pairs, where one gateway is designated as the primary and the other as the backup, and the backup assumes the operation of the primary (assumes the master role) in the event of a failure or maintenance of the primary gateway. A 1:1 redundancy scheme is the most robust, providing for fast switchover and broadest coverage. The robustness of a 1:1 redundancy scheme, however, comes at a high cost—the system requires twice the number of gateways, where half of the gateways are idle for the majority of the operational time of the network. Additionally, if both gateways of a redundant pair fail, then there is no backup option, and the associated terminals will experience service disruptions. In an N:M redundancy scheme, M gateways are deployed as a pool of backup gateways for N primary gateways, where any of the M backup gateways can assume the primary operation for any one of the N primary gateways. This scheme realizes a cost savings in that it reduces the total number of gateways deployed for the network—fewer backup gateways are required to cover for the N primary network gateways. Further, because any of the backup gateways can take over for a primary gateway that goes down, there generally should be an available backup, which would eliminate the issue of the 1:1 redundancy scheme, where on outage would occur if both the primary and backup gateways were down for a pool of terminals. While an N:M redundancy scheme realizes lower costs than a 1:1 redundancy scheme, the scheme still exhibits inefficiency and wasted resources as the M backup gateways are idle for the majority of the operational time of the network. An N:1 redundancy scheme realizes a maximum cost savings in that only one backup gateway is required for the N system gateways. This scheme, however, provides the lowest level of reliability, because there would not be sufficient backup resources in the event of multiple gateway failures.

For a redundancy scheme where all gateways remain operational, load balancing may be employed to maintain enough available system gateway resources to assume the operations of a failed gateway. For example, for full coverage, as with the 1:1 redundancy scheme, twice the number of required gateways (2N) are deployed, where each gateway operates at half the maximum load. Then, in the event of a gateway failure, the associated terminals can be transferred to one or more other gateways, based on current loads of the other gateways. In theory, all the terminals from a failed gateway can be hosted solely by any one of the other gateways since their respective loads are only half the maximum capacity. Alternatively, load balancing can also be employed with fewer than twice the required number of gateways running at half maximum load (N+M total system gateways, with each running at less than its maximum capacity). In such a scenario, the deployed gateways would each be operating at more than half capacity, but less than full capacity. Then, in the event of a gateway failure, the terminals of the failed gateway can be distributed to more than one of the other gateways (depending on current respective loads of the other gateways). The cost varies between such (N+M) and (2N) depending on the total number of gateways deployed. Such load balancing schemes, however, exhibit certain disadvantages, such as longer switchover times for the terminals of a failed gateway, and the need to employ load balancing algorithms to maintain each gateway load at a level to ensure that sufficient backup capacity is always available. While the switchover times may not be a significant issue for consumer applications (e.g., Internet browsing), the switchover time becomes more significant for enterprise subscribers in terms of reliability and quality of service (especially for real-time applications/services such as voice over IP). Further, load balancing presents a disadvantage for system operational maintenance (e.g., software updates)—terminal switchovers for system maintenance results in significant network route updates. Further, in some scenarios, either the approach described above or any other type of load balancing may not be a suitable option making the N:M redundancy approach a more attractive option.

Some implementations of N:M or N:1 redundancy employ a centralized network manager (NM) for management of redundancy takeover decisions. Either the NM polls the health of each gateway or each gateway sends a heartbeat to the NM. The NM then determines which gateway has failed and which backup gateway should take over. This, however, poses a further disadvantage in that, if there is a communication failure between the NM and the gateways or the NM itself experiences a failure (a single point of failure), then a gateway switchover cannot be executed to cover for a failed gateway (resulting in service disruptions). A peer-based redundancy approach would avoid such a single point of failure.

In accordance with example embodiments of the present invention, therefore, a flexible, peer-based N:M gateway redundancy protocol is provided. A virtual router redundancy or first-hop redundancy protocol is a networking protocol that is designed to provide redundancy for a default router or gateway employed on a subnetwork (subnet). A first-hop redundancy protocol provides for one or more backup routers, where one of the backup routers can serve as a backup for the IP address of the default router. In the event of failure of an active router, the backup router will take over the IP address for the failed router. An example of a router redundancy protocol is described in the Internet Engineering Task Force (IETF) publication, "Virtual Router Redundancy Protocol (VRRP)," RFC 3768, April 2004, which is incorporated by reference herein in its entirety. VRRP is a computer networking protocol whereby a group of network routers form a single virtual router to provide the default gateway functionality for the client hosts on a LAN. VRRP specifies an election protocol that dynamically assigns responsibility for a virtual router to one of the VRRP routers on a LAN. The VRRP router controlling the IP addresses associated with a virtual router (the Master router) forwards packets destined for these IP addresses. The election process provides dynamic fail over for the packet forwarding responsibility should the Master become unavailable, whereby any of the virtual router IP addresses on the LAN can be used as the default first hop router by end-hosts. VRRP is thus a peer-based scheme, where there is no central entity controlling the switchover operations. VRRP thereby provides for a higher availability default path without requiring configuration of dynamic routing or router discovery protocols on every end-host. VRRP is configured for operation on a local subnet, where all the routers are on a common LAN.

Figure 2:
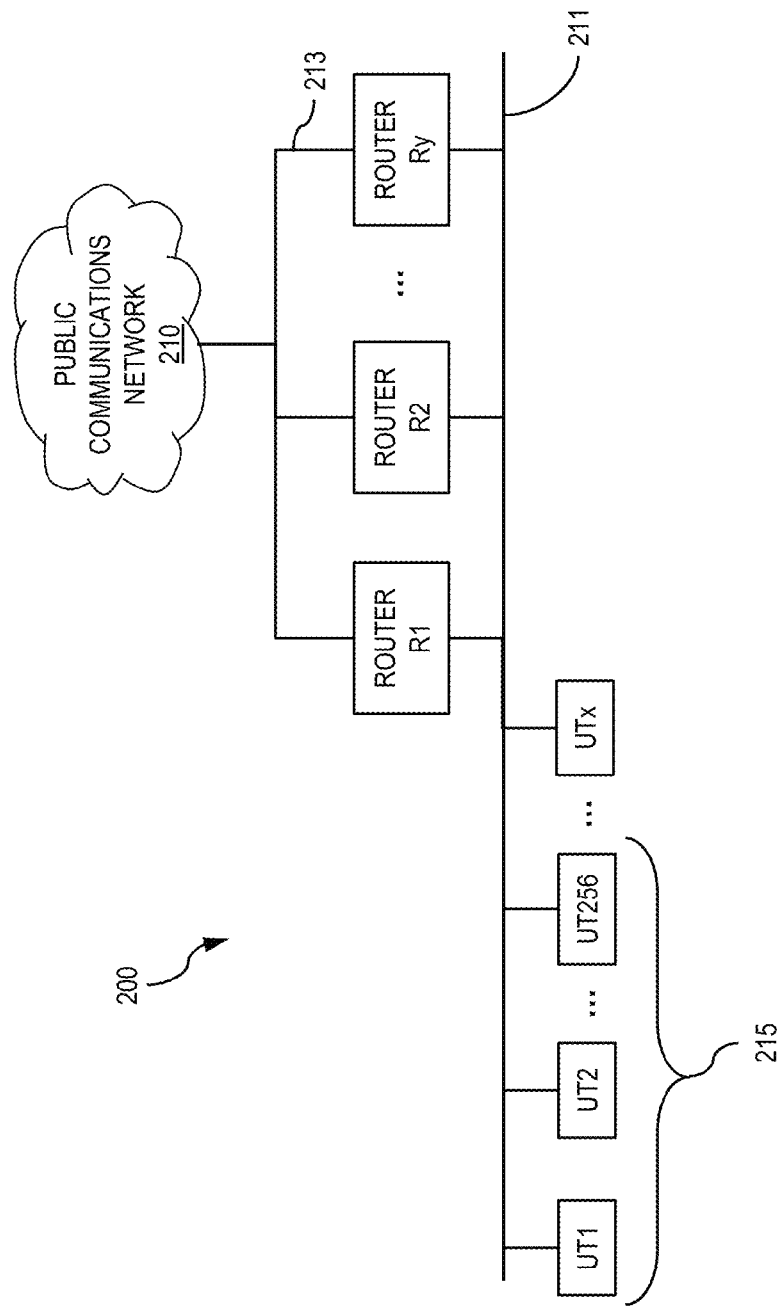
FIG. 2 illustrates a block diagram depicting a local area network or subnet configuration for the current Virtual Router Redundancy Protocol.

FIG. 2 illustrates a block diagram depicting a local area network or subnet configuration for a Virtual Router Redundancy Protocol (VRRP). The network 200 comprises a number of user terminals (UT1, UT2, . . . , UTx) and the number of routers (R1, R2, . . . , Ry). The user terminals are interfaced with the routers over the local area network (LAN) 211. The routers in turn interface with a public communications network 210 (e.g., the Internet) via the wide area network (WAN) 213. The user terminals (UT1, UT2, . . . , UTx), for example, are assigned the IP addresses 192.168.1.1, 192.168.1.2, . . . , 192.168.1.x, respectively, and the routers (R1, R2, . . . , Ry) are assigned the IP addresses 192.168.1.252, 192.168.1.253, . . . , 192.168.1.2yy. A pool or subset of the terminals (e.g., UT1-UT256) 215 may be assigned to a one of the routers (acting as the master router), serving as a default first-hop via a virtual IP address (e.g., 192.168.1.251). The virtual address may be static or may be dynamic (e.g., according to dynamic host configuration protocol (DHCP)). DHCP is a standardized network protocol used IP networks for dynamically distributing network configuration parameters, such as IP addresses for interfaces and services. With DHCP, computers request IP addresses and networking parameters automatically from a DHCP server.

For example, the router R1 (with physical IP address 192.168.1.252) may be assigned as the default router for the terminal pool 215, via the virtual address 192.168.1.251. Accordingly, each of the terminals in the group 215 is configured to transmit communications (e.g., communications to the network 210) via the virtual address 192.168.1.251. In the event of the unavailability of the router R1 (e.g., due to a failure), an alternate router (e.g., R2, with physical address 192.168.1.253) takes over as the master router, and assumes the forwarding responsibility for the terminal group 215, by servicing the virtual address 192.168.1.251. The master router also assumes the virtual media access control (MAC) address for the terminal group—so when a terminal in the group sends an address resolution request for the address 192.168.1.251, it receives the respective MAC address. In operation, the current master periodically transmits a VRRP advertisement to the other routers, effectively providing a heartbeat message. When a backup router fails to receive a certain number of VRRP advertisements from the current master, the backup router assumes that the current master is down, and immediately assumes the master role (servicing the virtual IP address and providing the respective MAC address). Further, a VRRP priority order is configured for each of the routers. Initially, each of the routers will send a VRRP advertisement (including its priority) via a multicast address monitored by all of the routers on the LAN. Each router receives the VRRP advertisements provided by the other routers, and each of the lower priority routers will defer the master role to the router of the highest priority for which the VRRP advertisements are provided over the LAN 211. In the event that the current master experiences a failure (e.g., the WAN connection of the master router goes down), the next highest priority router will then assume the master role.

Once the failed previous master becomes operational again, the router will pursue one of two options. As a first option, if the router is configured for a VRRP preempt function, then the former master will immediately retake the master role upon becoming operational again. Alternatively, if the router is not configured for the preempt function, then the previous master will assume the role of a backup router, and will only reassume the master role in the event that a current master fails and it is the highest priority backup router in line. VRRP may also be employed to provide load balancing among the universe of terminals on the LAN 211. For example, the terminals may be split into two groups, with each of the routers R1 and R2 serving as the master for a respective group, and also serving as the backup for the other router. Subsequently, in the event that either R1 or R2 experiences a failure, the other router will assume the master role for the failed router's terminal group in addition to its assigned terminal group.

Figure 3:
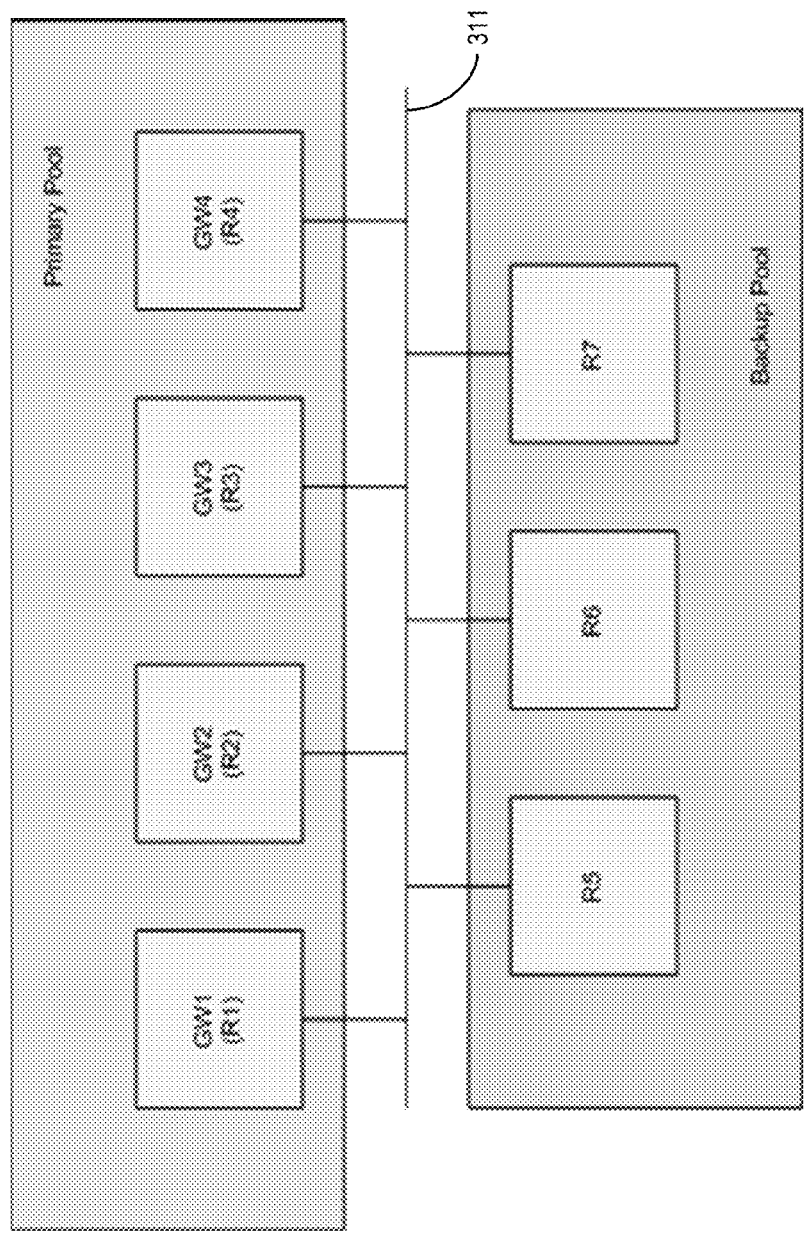
FIG. 3 illustrates a block diagram depicting a 4:3 gateway redundancy approach, in accordance with example embodiments.

FIG. 3 Illustrates a block diagram depicting a 4:3 redundancy approach, in accordance with example embodiments of the present invention. By way of example, in a customer enterprise network each gateway (GW1, GW2, GW3, GW4) supports or services a number of sites (e.g., each gateway may support 1000 sites—i.e., satellite terminals/CPEs, with the four gateways supporting a total of 4000 sites). Further, with a virtual redundancy protocol provided pursuant to example embodiments, for this example, a pool of 7 routers (R1, R2, . . . , R7) provides the redundancy for the operational functionality of the four gateways. In other words, each of the seven routers is capable of performing the roles/functions (including the servicing of the virtual router ID or address (VRID) for the respective gateway) for any of the four gateways (GW1, GW2, GW3 or GW4). As used in this sense, the physical hardware/software for each of the gateways (including the gateways/routers of the primary pool and the routers of the backup pool) is the same—the term "router" is being used in the sense of the gateway hardware/software, and the term "gateway" is being used in the sense of the gateway identity for the gateway that operates as a primary servicing the respective network terminals/sites). At any given time, four routers respectively serve in the roles of the master routers for the four gateways (GW1, GW2, GW3, GW4), while the remaining three routers serve as the pool of backup routers—as depicted in FIG. 3, initially, the four routers (R1, R2, R3, R4) serve in the master roles for the four gateways (G1, G2, G3, G4), respectively, and the three routers (R5, R6, R7) serve as backup routers in the backup pool. This scenario thereby provides a 4:3 redundancy approach (4 primary routers/gateways, with a pool of 3 backups). The seven routers are connected over the common network 311. Further, for the scenario depicted in FIG. 3, the redundancy protocol would be enabled on all of the routers with respective configured priorities, for example, priorities configured as shown below in Table 1. By way of further example, each router Rx may be configured with its own identity and configuration so that it can be managed by a network management system (NMS), whereby, as part of its configuration, each router may receive the identity and configuration information of all the gateways (gw_i.cf g), including the VRID and the Virtual IP Address of the gateway.

TABLE 1

Gateway/Router Priority Configuration

| VRID | Primary Pool | | | | Backup Pool | | |
|---|---|---|---|---|---|---|---|
| (GW ID) | R1 | R2 | R3 | R4 | R5 | R6 | R7 |
| GW1 | 254 | 249 | 248 | 247 | 253 | 252 | 251 |
| GW2 | 250 | 254 | 248 | 247 | 253 | 252 | 251 |
| GW3 | 250 | 249 | 254 | 247 | 253 | 252 | 251 |
| GW4 | 250 | 249 | 248 | 254 | 253 | 252 | 251 |

By way of further example, one of two configurations may be deployed in the network. In a first configuration, the gateways do not maintain any site-specific information regarding the universe of sites supported by the network. Accordingly, with that configuration a terminal may select any available gateway to support its communications sessions, which provides for dynamic flexibility with regard to the site or terminal pools supported by a given gateway and the point in time. For example, the enterprise sites can be dynamically allocated amongst the primary gateways for managing load balancing and reliability and quality of service factors. Further, with this first configuration, in the event of the unavailability of one of the primary gateways, a backup router could assume the responsibility of the unavailable primary gateway (i.e., assume the master role), as no site-specific information would be required to perform the assumed responsibilities. In a second configuration, each gateway maintains site-specific information (e.g., terminal/subnet addresses, MAC addresses, etc.) for the specific network sites serviced by the gateway. More specifically, each primary gateway maintains a set of configuration information files for the network sites assigned to that gateway for any given period of time. With this configuration, a network management system (NMS) would ensure that the set of configuration information files for the sites currently managed by each of the primary gateways is maintained by or available to each of the routers of the primary and the backup pool. This way, in the event of the unavailability of one of the primary gateways, a backup router could select or obtain the requisite site-specific information files in order to assume the responsibilities of the unavailable primary gateway. For example, in one embodiment of the second configuration, the current configuration information may be maintained (on a per-gateway basis) by each of the routers, as follows:

{(gw_1.cfg, siteInfo_1.cfg, ... ), (gw_2.cfg, siteInfo_2.cfg, ... ), ... (gw_4.cfg, siteInfo_4.cfg, ... )}

Then, when a fail-over situation occurs, for example, a failure of the router serving in the master role for GW2, the routing responsibilities of the GW2 would switch to the highest priority backup router, whereby the router re-launches the gateway applications using the stored GW2 configuration information file. From an implementation standpoint, it could simply be a launch or relaunch of the gateway applications with a link pointing to the new configuration file(s). Alternatively, in another embodiment of the second configuration, the current configuration information may be maintained (on a per-gateway basis) at a common storage location accessible to all of the routers. Then, when a fail-over situation occurs, for example, a failure of the GW2, the routing responsibilities of the GW2 would switch to the highest priority backup router, whereby the router acquires the GW2 configuration information file from the common storage location.

Based on the priority configuration shown in Table 1, R1 is the highest priority router for assuming the master role for gateway GW1 (priority=254), R2 is the highest priority router for assuming the master role for gateway GW2 (priority=254), R3 is the highest priority router for assuming the master role for gateway GW3 (priority=254), and R4 is the highest priority router for assuming the master role for gateway GW4 (priority=254). Further, also based on the priorities configuration shown above in Table 1, in the event of the unavailability of any of the primary gateways (e.g., based on a failure or scheduled maintenance), R5 is the first priority backup router to take over the master role for the unavailable router, R6 is the second priority backup router (e.g., R6 would assume the master role if R5 was unavailable), and R7 is the third priority backup router (e.g., R7 would assume the master role if both R5 and R6 were unavailable).

Moreover, each primary router is also configured as a backup router for the other gateways with a priority that is lower than the priority of the routers in the backup pool. For example, R1 (priority=250) can serve as a backup router for the gateways GW2, GW3 and GW4, with a priority lower than that of R5 (priority=253), R6 (priority=252) and R7 (priority=251). Accordingly, after the correction of a failure (or the completion of scheduled maintenance) with respect to GW1, once R1 is back online (if the system is not configured for preemption, as discussed below), R1 joins the backup pool with R6 and R7 (assuming that R5 assumed the master role for GW1). Then, in the event of the unavailability of any of the routers in the master roles for the gateways GW2, GW3 and GW4, R1 would assume the master role for the unavailable gateway if the routers R6 and R7 were unavailable (if either R6 or R7 were available, it would assume the role over R1 based on priority level). Alternatively, after joining the backup pool, in the event that the router R5 became unavailable, the router R1 would reassume the master role for the gateway GW1 (as the higher priority router for that role over the other routers in the pool, R6 and R7). Such an approach provides an efficient and effective redundancy scheme, where the backup pool is continually replenished as the unavailable routers are brought back online—an aspect most critically appreciated as compared to an N:1 redundancy scenario, as multiple gateway failures can be handled (so long as the failures are sufficiently far apart to allow the failed routers to be brought back online to join the backup pool).

It follows that the priorities configuration of Table 1 results in the following priority list for each gateway, in descending order of priority down the respective columns of Table 2:

TABLE 2

Router Priority List for each GW

| GW1 | GW2 | GW3 | GW4 |
|---|---|---|---|
| R1 | R2 | R3 | R4 |
| R5 | R5 | R5 | R5 |
| R6 | R6 | R6 | R6 |
| R7 | R7 | R7 | R7 |
| R2 | R1 | R1 | R1 |
| R3 | R3 | R2 | R2 |
| R4 | R4 | R4 | R3 |

Therefore, with the priorities configured as set forth in Table 1, in accordance with example embodiments of the present invention, in the event of the unavailability of any one of the routers in the primary pool, any one of the routers in the backup pool is configured to assume the master role for the respective gateway, and the unavailable router would be available to join the backup pool once it is brought back online. Further, according to such example embodiments, the routers are not configured in preempt mode (e.g., the preempt flag is not set for any of the routers). With the preempt feature disabled, once it is brought back online, a higher priority router would be prevented from immediately reclaiming the master role from the backup routers. If the preempt feature were enabled, then that configuration would lead to more frequent and unnecessary gateway router changes. For example, in a scenario where the router R1 fails, and the router R5 takes over for R1—with the preempt feature enabled, once R1 comes back online, it would immediately reclaim the master role from R5 resulting in an unnecessary disruption in the communications between the respective site terminals and the GW. With the preempt feature disabled, the extra switch (from R5 back to R1) would not be necessary—in that configuration, all routers essentially become equal with respect to serving primary versus backup roles at any given time. For the same reason, the virtual redundancy priority on the router is never set to 255, and the router is not configured to own the IP address(es) associated with the virtual router.

Additionally, according to such example embodiments, because a gateway typically supports a large number of sites/terminals, in order to prevent failures and service degradation due to overloading, each router is configured so that it can only serve in the master role for only one respective gateway. In other words, one router cannot take over for multiple failed GWs.

A virtual redundancy router maintains an instance of the state machine for each virtual router election with respect to which it is participating. By way of example, the virtual redundancy router maintains a Global_Master_State initialized to FALSE, and upon transitioning to a master role for a gateway, the transitioned router sets the Global_Master_State to TRUE. Further, the flag should be reset to FALSE if relinquishing the master role (e.g., due to a Shutdown event or due to a transition to the Backup-state). Once the Global_Master_State is set to TRUE, the router effectively ignores the virtual redundancy advertisements and the Master_Down_Timer event for those state machines that are in the Backup-state by resetting the Master_Down_Timer to Master_Downinterval.

Accordingly, upon transitioning to a master role for a respective gateway, the transitioned router accepts and processes virtual redundancy advertisements from other routers for only the gateway (GW ID) or VRID for which it is the current Master—the router will effectively ignore all other redundancy advertisements. When a router is not currently serving in a master role for any of the gateways (VRIDs) (i.e., Global_Master_State is False)—the router is serving as a backup within the backup pool for all the gateways (VRIDs)—the router processes the virtual redundancy advertisements for all gateways (VRIDs), and will assume the master role for any gateway when the respective primary router for the gateway becomes unavailable (following the priority rules set forth above). Accordingly, the approach of such example embodiments provides for an efficient N:M gateway redundancy protocol.

In accordance with example embodiments, in contrast with the Backup-state of the VRRP described in the IETF RFC 3768, the purpose of the Backup-state is to monitor the availability and state of the Master Router. By way of example, while in the Backup-state, a virtual redundancy router will not respond to address resolution protocol (ARP) requests for the IP address(es) associated with the virtual router, will discard packets with a destination link layer MAC address equal to the virtual router MAC address, and will not accept packets addressed to the IP address(es) associated with the virtual router. By way of further example, while in the Backup-state, if the Global_Master_State is set to TRUE, a virtual redundancy router will reset the Master_Down_Timer to Master_Down_Interval in response to a Master_Down_Timer event or when an advertisement is received from a peer. Certain operations of the virtual router in the Backup-state may be expressed, for example, in pseudo-code format as follows:

```
If a Shutdown event is received, then:
    Cancel the Master_Down_Timer
    Transition to the {Initialize} state
endif
If the Master_Down_Timer fires, then:
    If Global_Master_State is True, then:
        Reset the Master_Down_Timer to Master_Down_Interval
    else:
        Send an ADVERTISEMENT
        Broadcast a gratuitous ARP request containing the virtual router MAC address for each
            IP address associated with the virtual router
        Set the Adver_Timer to Advertisement_Interval
        Transition to the {Master} state
        Set Global_Master_State to True
    endif
endif
If an ADVERTISEMENT is received, then:
    If Global_Master_State is True, then:
        Reset the Master_Down_Timer to Master_Down_Interval
    else:
        If the Priority in the ADVERTISEMENT is Zero, then:
            Set the Master_Down_Timer to Skew_Time
        else:
            If Preempt_Mode is False, or If the Priority in the ADVERTISEMENT is greater than or
                equal to the local Priority, then:
                Reset the Master_Down_Timer to Master_Down_Interval
            else:
                Discard the ADVERTISEMENT
            endif
        endif
    endif
endif
```

In accordance with further example embodiments, in contrast with the Master-state of the VRRP described in the IETF RFC 3768, while in the Master-state the virtual router functions as the forwarding router for the IP address(es) associated with the router. By way of example, while in the Master-state, a virtual redundancy router will respond to ARP requests for the IP address(es) associated with the virtual router, will forward packets with a destination link layer MAC address equal to the virtual router MAC address, will not accept packets addressed to the IP address(es) associated with the virtual router if it is not the IP address owner, and will accept packets addressed to the IP address(es) associated with the virtual router if it is the IP address owner. By way of further example, while in the Master-state, the virtual router will reset the Global_Master_state to FALSE if relinquishing the master role or a shutdown event is received. Certain operations of the virtual router in the Master-state may be expressed, for example, in pseudo-code format as follows:

```
If a Shutdown event is received, then:
    Cancel the Adver_Timer
    Send an ADVERTISEMENT with Priority = 0
    Transition to the {Initialize} state
    Set Global_Master_State to False
endif
If the Adver_Timer fires, then:
    Send an ADVERTISEMENT
    Reset the Adver_Timer to Advertisement_Interval
endif
If an ADVERTISEMENT is received, then:
    If the Priority in the ADVERTISEMENT is Zero, then:
        Send an ADVERTISEMENT
        Reset the Adver_Timer to Advertisement_Interval
    else:
        If the Priority in the ADVERTISEMENT is greater than the local Priority,
        or If the Priority in the ADVERTISEMENT is equal to the local Priority and the primary IP
        Address of the sender is greater than the local primary IP Address, then:
            Cancel Adver_Timer
            Set Master_Down_Timer to Master_Down_Interval
            Transition to the {Backup} state
            Set Global_Master_State to FALSE
        else:
            Discard ADVERTISEMENT
        endif
    endif
endif
```

On the terminal or site end, in the event of the switch to a new router serving the master role for a gateway, the reaction of a respective terminal served by that gateway would depend on whether the terminal is in an idle or active state at the time of the router switchover. In the case of an idle terminal, with respect to established connections or tunnels (e.g., IPsec, TCP, etc.), typically a higher layer protocol of the terminal will send 'Keep-Alive' messages to the respective gateway. However, because the new router (which has taken over the master role due to the unavailability of the previous primary router) has no prior knowledge of the established connections and/or tunnels, the terminal would be triggered to tear down the old connection/tunnel and establish a new connection/tunnel with the new gateway (e.g., based on a reset or timeout condition). In the case of an active terminal (with active ongoing data communications between the terminal and the gateway, the new router/gateway would trigger a reset for the terminal to reestablish the connection/tunnel (again, because the new router has no has no prior knowledge of the established connections and/or tunnels).

In accordance with further example embodiments, such an approach for N:M gateway redundancy is provided for gateways distributed amongst various geographical locations, which can potentially span many hundreds or even thousands of miles (e.g., across the United States). For example, gateways may be located in different regions of the country based on seasonal weather patterns, such that weather outages in one region can be covered by gateway redundancy in a region not affected by the same weather patterns or events. Accordingly, gateways are typically located in multiple different geographical locations, so that in the event of a gateway outage in one region the respective terminals can be covered by a redundant gateway in another region (with a higher likelihood of not suffering from the same outage). By way of example, two different scenarios may exist with respect to such geographic redundancy approaches. According to a first scenario, the geographically redundant gateways may be operating on the same subnet (e.g., via Ethernet bridging). According to a second scenario, the geographically redundant gateways operate on different subnets. In either scenario, according to one example embodiment, a first goal of the redundancy approach is to have the terminals associated with a gateway that becomes unavailable remain with a gateway of the same network operations center (NOC). For example, as depicted by FIGS. 1A and 1B, multiple IP gateways are typically co-located within a common Gateway or network operations center. Then, after exhaustion of all options for maintaining the terminals with a gateway at the same operations center, according to this embodiment, the terminals would be switched to a gateway located at a different network operations center.

Figure 4:
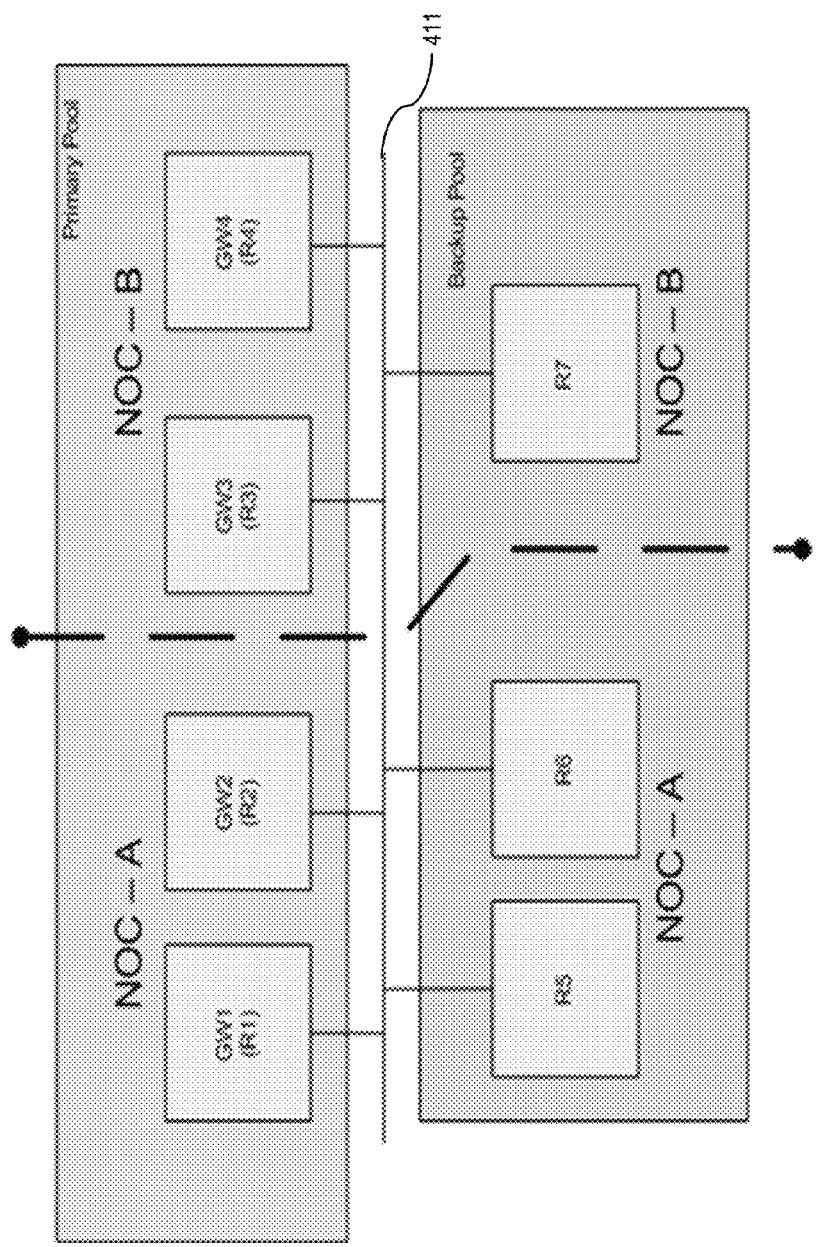
FIG. 4 illustrates a block diagram depicting a 4:3 gateway redundancy approach, with redundancy for geographically distributed network operations centers (NOCs) on a common subnet, in accordance with example embodiments.

FIG. 4 illustrates a block diagram depicting a 4:3 gateway redundancy approach, with redundancy for geographically distributed network operations centers (NOCs) on a common subnet, in accordance with example embodiments. With reference to FIG. 4, the gateway instances GW1 and GW2 and the routers R1, R2, R5, R6 are located in the network operations center NOC-A, and the gateway instances GW3 and GW4 and the routers R3, R4, R7, are located in the network operations center NOC-B. The NOCs A and B may be situated in different geographical locations, but are bridged together to be on the same subnet 411. With this configuration, according to one embodiment, the redundancy priorities of the routers R1, R2, . . . , R7 are configured such that the routers located at a particular NOC site are preferred for the master roles for the gateways located at that NOC site over the routers located at a different NOC site. By way of example, the routers R1 and R2 would have priorities configured to set them as the preferred routers to serve in the master roles for the gateways GW1 and GW2, respectively, with the routers R5 and R6 having priorities configured to set them as the preferred backup routers for the gateways GW1 and GW2 over the routers R3, R4, R7. Similarly, the routers R3 and R4 would have priorities configured to set them as the preferred routers to serve in the master roles for the gateways GW3 and GW4, respectively, with the router R7 having a priority configured to set it as the preferred backup router for the gateways GW3 and GW4 over the routers R1, R2, R5, R6. One reason for such a configuration is that, with a bridge in the middle, it is expected that inter-NOC communications between the routers of different NOCs would incur a relatively higher delay as compared to intra-NOC communications between routers of the same NOC. Then, a router from NOC-A would be selected as a backup for an unavailable master router in NOC-B only when no routers at NOC-B are available—and vice-versa. Further, when a failed router from NOC-A is brought back online, it would be preferred as a backup for the NOC-A gateways over the routers of NOC-B—and vice-versa. Table 3 provides an example priority configuration for the scenario of FIG. 4:

TABLE 3

Priority Configuration for Geographical NOC Redundancy and Common Subnet

| VRID | Primary Pool | | | | Backup Pool | | |
|------|----|----|----|----|----|----|----|
| (GW ID) | R1 | R2 | R3 | R4 | R5 | R6 | R7 |
| 1 | 254 | 251 | 249 | 248 | 253 | 252 | 250 |
| 2 | 251 | 254 | 249 | 248 | 253 | 252 | 250 |
| 3 | 249 | 248 | 254 | 252 | 251 | 250 | 253 |
| 4 | 249 | 248 | 252 | 254 | 251 | 250 | 253 |

Further, such a priority configuration results in the priority list of Table 4, for each of the GWs:

TABLE 4

Router Priority List for Each GW - Geographical NOC Redundancy and Common Subnet

| GW1 | GW2 | GW3 | GW4 |
|-----|-----|-----|-----|
| R1 | R2 | R3 | R4 |
| R5 | R5 | R7 | R7 |
| R6 | R6 | R4 | R3 |
| R2 | R1 | R5 | R5 |
| R7 | R7 | R6 | R6 |
| R3 | R3 | R1 | R1 |
| R4 | R4 | R2 | R2 |

Figure 5:
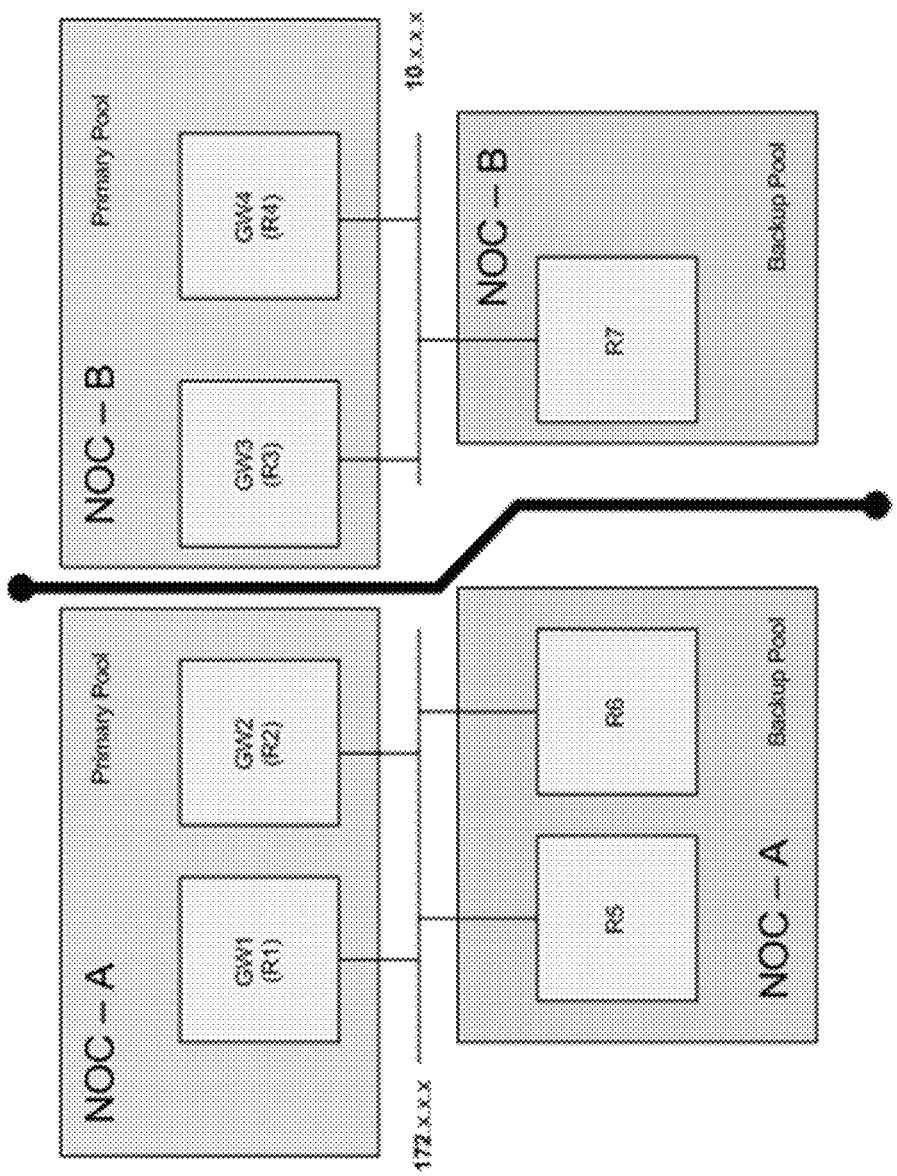
FIG. 5 illustrates a block diagram depicting a 4:3 gateway redundancy approach, with redundancy for geographically distributed network operations centers (NOCs) on different subnets, in accordance with example embodiments.

FIG. 5 illustrates a block diagram depicting a 4:3 gateway redundancy approach, with redundancy for geographically distributed network operations centers (NOCs) on different subnets, in accordance with example embodiments. Similar to the network of FIG. 4, as depicted in FIG. 5, the gateway instances GW1 and GW2 and the routers R1, R2, R5, R6 are located in the network operations center NOC-A, and the gateway instances GW3 and GW4 and the routers R3, R4, R7, are located in the network operations center NOC-B. In this scenario, however, the network operations centers NOC-A and NOC-B are on different subnets—172.x.x.x and 10.x.x.x, respectively. In such a scenario, according to a further example embodiment, the gateway redundancy approach is employed independently at each NOC. Table 5 shows the virtual redundancy priorities configuration at each NOC. More specifically, by way of example, the routers R1 and R2 serve in the master roles for the gateways GW1 and GW2, respectively, and the routers R5 and R6 serve as the backup routers for the NOC-A gateways GW1 and GW2. The routers R3 and R4 serve in the master roles for the gateways GW3 and GW4, respectively, and the router R7 serves as the backup router for the NOC-B gateways GW3 and GW4. Table 5 provides an example priority configuration for the scenario of FIG. 5:

TABLE 5

Router Priority List for Each GW-
Geographical NOC Redundancy and Different Subnet

| VRID (GW ID) | Priorities: NOC-A | | | | VRID (GW ID) | Priorities: NOC-B | | |
|---|---|---|---|---|---|---|---|---|
| | Primary Pool | | Backup Pool | | | Primary Pool | | Backup Pool |
| | R1 | R2 | R5 | R6 | | R3 | R4 | R7 |
| 1 | 254 | 251 | 253 | 252 | 3 | 254 | 252 | 253 |
| 2 | 251 | 254 | 253 | 252 | 4 | 252 | 254 | 253 |

Further, such a priority configuration results in the following priority list (Table 6) for each of the GWs:

TABLE 6

Router Priority List for Each GW - Geographical
NOC Redundancy and Different Subnet

| GW1 | GW2 | GW3 | GW4 |
|---|---|---|---|
| R1 | R2 | R3 | R4 |
| R5 | R5 | R7 | R7 |
| R6 | R6 | R4 | R3 |
| R2 | R1 | | |

In terms of performance, the foregoing approaches of example embodiments are well suited for both geographical redundancy and load balancing. A terminal is provided with a list of gateways (GW1, GW2, GW3, and GW4—See, e.g., FIG. 4) and their associated NOC ID (A or B). With a 'home' or a 'default' NOC defined, the terminal selects a gateway from the list of gateways for load balancing (e.g., based on the load and/or other factors) at the home/default NOC with which the terminal establishes connectivity at startup. If the selected gateway experiences a failure or is subjected to an event that renders it unavailable, a backup router at the same NOC takes over for the unavailable gateway, and the terminal quickly restores its connectivity with the same gateway (the "personality" of which has been assumed by the backup router). The switchover time is deterministic and the overall load balance is un-disturbed. If the connectivity cannot be restored for some reason, the terminal would then try other gateways at the same NOC. Finally, if connectivity cannot be established with any of the gateways at the home/default NOC, the terminal would then select from the available gateways of other NOC(s).

Accordingly, the approaches of example embodiments of the present invention provides for an efficient, cost effective and reliable N:M Gateway redundancy protocol, where $1 \leq M \leq N$. Such approaches further provide for an effective mechanism for replenishing the pool of available backup routers, whereby, once a replaced primary router is brought back online, it joins the respective router backup pool. Such approaches also are well suited and easily applicable to redundancy schemes for geographically distributed gateways (either on a common or different subnets). Such approaches also effectively support load balancing schemes, as well providing for fast, deterministic and load-preserving switchovers without triggering any significant route updates in the network.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

Figure 6:
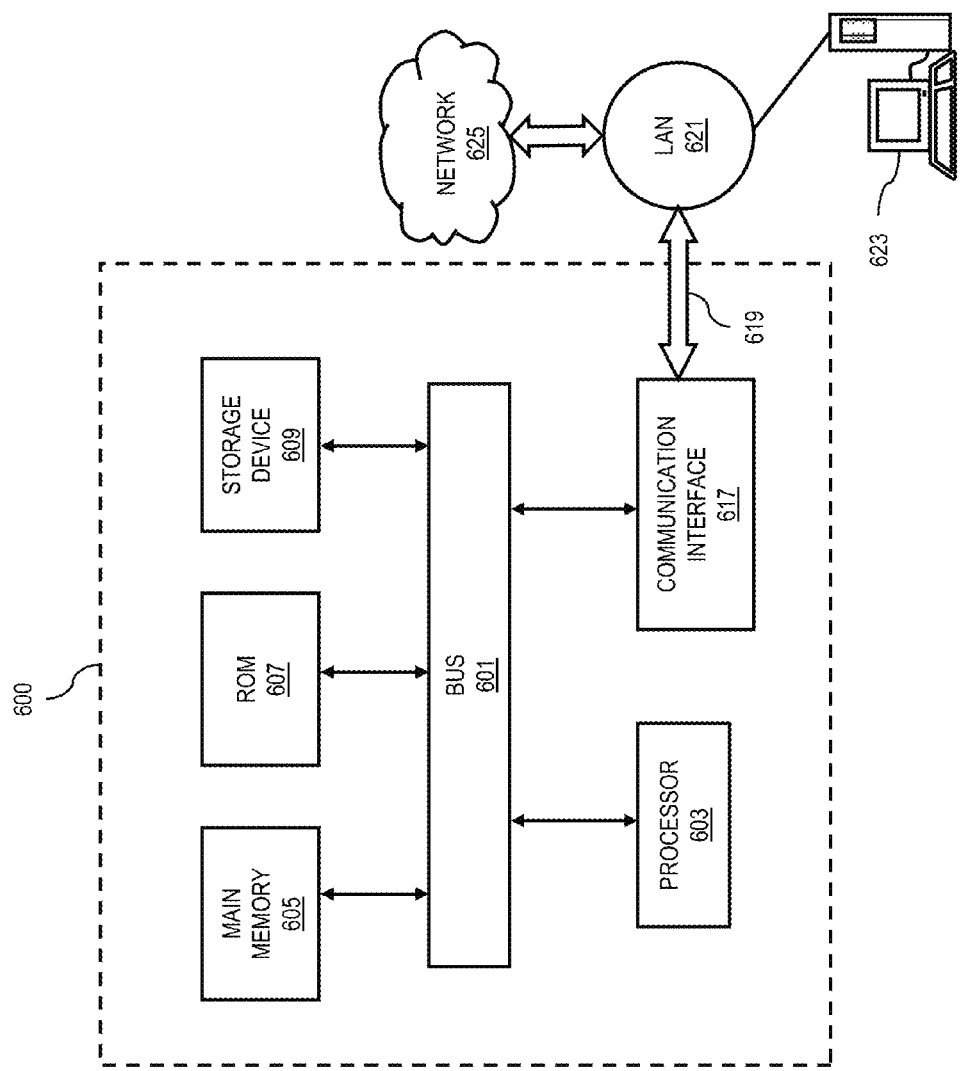
FIG. 6 illustrates a computer system upon which example embodiments according to the present invention can be implemented.

FIG. 6 illustrates a computer system upon which exemplary embodiments according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

According to one embodiment of the invention, dynamic and flexible approaches for selective dynamic disabling of transport layer handshake spoofing, are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry is used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. Further, the communication interface 617, for example, includes peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 provides a connection through local network 621 to a host computer 623, which has connectivity to a network 625 (e.g. a wide area network (WAN) or the global packet data communication network now commonly referred to as the "Internet") or to data equipment operated by service provider. The computer system 600 sends messages and receives data, including program code, through the network(s), network link 619, and communication interface 617. In the Internet example, a server (not shown) might transmit requested code belonging to an application program for implementing an embodiment of the present invention through the network 625, local network 621 and communication interface 617. The processor 603 executes the transmitted code while being received and/or store the code in storage device, or other non-volatile storage for later execution.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media may include dynamic memory, such as main memory 605. Transmission media may include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention. The specification and drawings are accordingly to be regarded in an illustrative rather than restrictive sense.

What is claimed is:

1. A communications system comprising a plurality of gateway devices, wherein:

at any point in time, each of a first group of the gateway devices is configured to operate as an active gateway node of the communications system identified by a respective unique gateway identification number (GWID), and each of a second group of the gateway devices is configured to operate as a backup gateway for the active gateway nodes;

each gateway device has a plurality of assigned backup priority levels with each level corresponding to a respective one of the GWIDs, wherein the assigned backup priority level for each GWID differs from one gateway device to another gateway device;

in the event of a failure or other event that renders a one of the gateway devices of the first group non-operational, which was operating as an active gateway node identified by a GWID x, the gateway devices are configured such that the gateway device of the second group of gateway devices, which has a highest assigned backup priority level corresponding to the GWID x, will assume the operation as the active gateway node identified by the GWID x;

each gateway device is configured to operate as an active gateway node of the communications system for only one respective GWID at any given time; and wherein each gateway device is configured to, while operating as a backup gateway, not respond to any address resolution protocol request associated with any of the active gateway nodes, discard any data packet with a destination link layer address for any of the active gateway nodes, and reject any data packet addressed to any of the active gateway nodes.

2. The communications system according to claim 1, wherein:
a first subset of the gateway devices of the first group and a first subset of the gateway devices of the second group are located at a first network operations site that is situated at a different geographic location than that of a further network operations site of each of one or more respective other subsets of the gateway devices of the first group and one or more respective other subsets of the gateway devices of the second group;
the gateway devices of each network operations site are interconnected via a respective local network; and
the gateway devices of the first network operations site are interconnected with the gateway devices of each further network operations site via a wide-area network.

3. The communications system according to claim 2, wherein:
the local network of the gateway devices of the first network operations site and the local network of the gateway devices of each further network operations site are on a common subnet of the wide-area network; and
the backup priority levels assigned to the gateway devices are configured whereby the gateway devices of the first subset of the gateway devices of the second group are preferred as backup gateways for the GWIDs of the active gateway nodes operating at the first site over the gateway devices of the one or more other subsets of the gateway devices of the second group.

4. The communications system according to claim 2, wherein:
the local network of the gateway devices of the first network operations site is on a different subnet of the wide-area network than the local network of the gateway devices of each further network operations site; and
each gateway device is configured to perform the assumption of the operation of a non-operational active gateway node of the first network operations site only when the gateway device is operating as a backup gateway of the first network operations site.

5. The communications system according to claim 2, wherein:
the local network of the gateway devices of the first network operations site is on a different subnet of the wide-area network than the local network of the gateway devices of each of at least one further network operations site;
the local network of the gateway devices of the first network operations site and the local network of the gateway devices of each of at least one further network operations site are on a common subnet of the wide-area network; and
each gateway device is configured to perform the assumption of the operation of a non-operational active gateway node of the first network operations site only when the gateway device is operating as a backup gateway of the first network operations site or of a one of the further network operations sites that is on the common subnet of the wide-area network.

6. The communications system according to claim 5, wherein:
the backup priority levels assigned to the gateway devices are configured whereby the gateway devices of the first subset of the gateway devices of the second group are preferred as backup gateways for the GWIDs of the active gateway nodes operating at the first site over the gateway devices of each of the one or more other subsets of the gateway devices of the second group that is on the common subnet of the wide-area network.

7. The communications system according to claim 1, wherein:
each gateway device is configured to, while operating as an active gateway, periodically transmit a heartbeat message, which indicates that the gateway device is operational, in a manner whereby the gateway devices of the second group are able to receive the heartbeat message; and
each gateway device is configured to, while operating as a backup gateway, and in the event that the gateway device does not receive a preconfigured successive number of respective heartbeat messages of an active gateway node, assume that the active gateway node is non-operational, and determine whether to perform the assumption of the operation of the non-operational active gateway node based on its backup priority level with respect to the GWID of the non-operational active gateway node relative to the backup priority levels of the other gateway devices operating as backup gateways.

8. The communications system according to claim 1, wherein each gateway device is configured to, while operating as an active gateway node identified by a respective one GWID, respond to any address resolution protocol request associated with the active gateway node identified by the one GWID, forward any data packet with a destination link layer address for the active gateway node identified by the one GWID, and accept any data packet addressed to the active gateway node identified by the one GWID.

9. The communications system according to claim 1, wherein, upon restoration of the non-operational gateway device to an operational state, that gateway device is configured to operate as a one of the backup gateways of the second group in place of the gateway device that assumed the operation as the active gateway node identified by the GWID x.

10. A method comprising:
in the event of a failure or other event that renders a first gateway device non-operational, assuming, by a second gateway device, operation of the first gateway device;
wherein the first gateway device is one of a first group of gateway devices each operating as an active gateway node of a communications network, and the second gateway device is one of a second group of gateway devices each operating as a backup gateway for the active gateway nodes;
wherein each active gateway node is identified by a unique gateway identification number (GWID), and wherein the operation of the first gateway device assumed by the second gateway device is the operation as the active gateway node identified by a GWID x;
wherein each gateway device has a plurality of assigned backup priority levels with each level corresponding to a respective one of the GWIDs, wherein the assigned backup priority level for each GWID differs from one gateway device to another gateway device;
wherein each gateway device of the first group operates as an active gateway node for only one respective GWID at any given point in time;
wherein the assumption of the operation of the first gateway device includes a determination by the second gateway device that it has a highest assigned backup priority level corresponding to the GWID x of the gateway devices of the second group of gateway devices; and wherein each gateway device, while operating as a backup gateway, ignores any address resolution protocol request associated with any of the active gateway nodes, discards any data packet with a destination link layer address for any of the active gateway nodes, and rejects any data packet addressed to any of the active gateway nodes.

11. The method according to claim 10, wherein:

a first subset of the gateway devices of the first group and a first subset of the gateway devices of the second group are located at a first network operations site that is situated at a different geographic location than that of a further network operations site of each of one or more respective other subsets of the gateway devices of the first group and one or more respective other subsets of the gateway devices of the second group;

the gateway devices of each network operations site communicate with each other via a respective local network; and the gateway devices of the first network operations site communicate with the gateway devices of each further network operations site via a wide-area network.

12. The method according to claim 11, wherein:

the local network of the gateway devices of the first network operations site and the local network of the gateway devices of each further network operations site are on a common subnet of the wide-area network; and the backup priority levels assigned to the gateway devices are configured whereby the gateway devices of the first subset of the gateway devices of the second group are preferred as backup gateways for the GWIDs of the active gateway nodes operating at the first site over the gateway devices of the one or more other subsets of the gateway devices of the second group.

13. The method to claim 11, wherein:

the local network of the gateway devices of the first network operations site is on a different subnet of the wide-area network than the local network of the gateway devices of each further network operations site;

the first gateway device is located at the first network operations site; and the second gateway device must be operating as a backup gateway of the first network operations site in order to assume the operation of the first gateway device.

14. The method according to claim 11, wherein:

the local network of the gateway devices of the first network operations site is on a different subnet of the wide-area network than the local network of the gateway devices of each of at least one further network operations site;

the local network of the gateway devices of the first network operations site and the local network of the gateway devices of each of at least one further network operations site are on a common subnet of the wide-area network;

the first gateway device is located at the first network operations site; and the second gateway device must be operating as a backup gateway of the first network operations site or of a one of the further network operations sites that is on the common subnet of the wide-area network in order to assume the operation of the first gateway device.

15. The method according to claim 14, wherein:

the backup priority levels assigned to the gateway nodes devices are configured whereby the gateway devices of the first subset of the gateway devices of the second group are preferred as backup gateways for the GWIDs of the active gateway nodes operating at the first site over the gateway devices of each of the one or more other subsets of the gateway devices of the second group that is on the common subnet of the wide-area network.

16. The method according to claim 10, further comprising:

periodically transmitting, by each gateway device, while operating as an active gateway, a heartbeat message, which indicates that the gateway device is operational, in a manner whereby the gateway devices of the second group are able to receive the heartbeat message;

receiving, by each gateway device, while operating as a backup gateway, the periodic heartbeat messages of the gateway devices operating as active gateway nodes; and in the event that a preconfigured successive number of heartbeat messages of a respective active gateway node are not received by at least one of the gateway devices of the second group, each such gateway devices assumes that the primary gateway node is non-operational, and determines whether to assume the operation of the non-operational active gateway node based on its backup priority level with respect to the GWID of the non-operational active gateway node relative to the backup priority levels of the other gateway devices of the second group.

17. The method according to claim 10, wherein each gateway device, while operating as an active gateway node identified by a respective one GWID, responds to any address resolution protocol request associated with the active gateway node identified by the one GWID, forwards any data packet with a destination link layer address for the active gateway node identified by the one GWID, and accepts data packets addressed to the active gateway node identified by the one GWID.

18. The method according to claim 10, wherein upon restoration of the non-operational gateway device to an operational state, that gateway device operates as a one of the backup gateways of the second group in place of the gateway device that assumed the operation as the active gateway node identified by the GWID x.

* * * * *